United States Patent
Mochizuki et al.

(10) Patent No.: US 10,130,069 B2
(45) Date of Patent: Nov. 20, 2018

(54) PRODUCTION METHOD FOR ANIMAL EXCREMENT TREATMENT MATERIAL AND PRODUCTION DEVICE THEREFOR

(71) Applicants: Shotaro Mochizuki, Shizuoka (JP); Hidekazu Yamada, Shizuoka (JP); Takahiro Otomo, Shizuoka (JP); Tatsuya Sogo, Kagawa (JP); Chiyo Takagi, Kagawa (JP)

(72) Inventors: Shotaro Mochizuki, Shizuoka (JP); Hidekazu Yamada, Shizuoka (JP); Takahiro Otomo, Shizuoka (JP); Tatsuya Sogo, Kagawa (JP); Chiyo Takagi, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 0 days.

(21) Appl. No.: 14/778,858

(22) PCT Filed: May 8, 2013

(86) PCT No.: PCT/JP2013/062965
§ 371 (c)(1),
(2) Date: Sep. 21, 2015

(87) PCT Pub. No.: WO2014/147851
PCT Pub. Date: Sep. 25, 2014

(65) Prior Publication Data
US 2016/0044890 A1 Feb. 18, 2016

(30) Foreign Application Priority Data

Mar. 22, 2013 (JP) .................................. 2013-060924

(51) Int. Cl.
*A01K 1/015* (2006.01)
*B02C 23/14* (2006.01)
(Continued)

(52) U.S. Cl.
CPC .......... *A01K 1/0155* (2013.01); *A01K 1/0152* (2013.01); *A01K 1/0154* (2013.01);
(Continued)

(58) Field of Classification Search
CPC .. A01K 1/0155; A01K 1/0152; A01K 1/0154; B02C 13/13; B02C 13/284; B02C 23/38; B02C 23/14; B02C 21/00
See application file for complete search history.

(56) References Cited

U.S. PATENT DOCUMENTS 3,676,029 A * 7/1972 Hopkin .................. B29B 9/065
264/142
6,619,233 B1 * 9/2003 Mochizuki ........... A01K 1/0155
119/171
(Continued)

FOREIGN PATENT DOCUMENTS

CN 1444849 A 10/2003
CN 102150626 * 8/2011 ............. A01K 1/015
(Continued)

OTHER PUBLICATIONS

Chinese First Office Action and English translation from corresponding Chinese application No. 2013800749536 dated Oct. 26, 2016 (14 pgs).
(Continued)

Primary Examiner — Jessica Cahill
Assistant Examiner — Joseph Finan, Jr.
(74) Attorney, Agent, or Firm — Brinks Gilson & Lione

(57) ABSTRACT

A production method for animal excretion treatment material and a production device therefor, having a step in which a raw material is pulverized and a pulverized material is obtained and a step in which the pulverized material is granulized. In the step in which the pulverized material is obtained, the raw material is pulverized by a pulverizer and
(Continued)

the pulverized material is obtained. The pulverizer has: an insertion port for the raw material; a pulverization chamber for the raw material; a pulverization mechanism provided inside the pulverization chamber; a mesh screen through which passes the raw material pulverized by the pulverization mechanism and having a plurality of openings; and a discharge port connected to the openings in the mesh screen.

4 Claims, 8 Drawing Sheets

(51) Int. Cl.
    *B02C 23/38*     (2006.01)
    *B02C 13/284*     (2006.01)
    *B02C 13/13*     (2006.01)
    *B02C 21/00*     (2006.01)

(52) U.S. Cl.
    CPC ............ *B02C 13/13* (2013.01); *B02C 13/284* (2013.01); *B02C 23/14* (2013.01); *B02C 23/38* (2013.01); *B02C 21/00* (2013.01)

(56) References Cited

U.S. PATENT DOCUMENTS

| | | | |
|---|---|---|---|
| 6,763,783 B2 * | 7/2004 | Mochizuki | ........... A01K 1/0155 119/171 |
| 2003/0196606 A1 | 10/2003 | Mochizuki | |
| 2011/0204166 A1 | 8/2011 | Mochizuki | |
| 2011/0297185 A1 * | 12/2011 | Godin | ..................... A61L 15/28 134/6 |

FOREIGN PATENT DOCUMENTS

| | | | | |
|---|---|---|---|---|
| CN | 102150626 A | * | 8/2011 | |
| CN | 202178118 | * | 3/2012 | .......... Y02W 30/821 |
| CN | 202178118 U | * | 3/2012 | |
| CN | 202490649 U | | 10/2012 | |
| JP | H07-031914 A | | 2/1995 | |
| JP | H7-205147 | | 8/1995 | |
| JP | 2001-204288 A | | 7/2001 | |
| JP | 2003-274780 A | | 9/2003 | |
| JP | 2006-000782 A | | 1/2006 | |
| JP | 2006-296218 A | | 11/2006 | |
| JP | 2007-043973 A | | 2/2007 | |
| JP | 2007-043988 A | | 2/2007 | |
| JP | 2007-135424 A | | 6/2007 | |
| JP | 2009-273418 A | | 11/2009 | |
| JP | 2010-001370 A | | 1/2010 | |
| JP | 2010-247013 A | | 11/2010 | |
| JP | 2011-172515 A | | 9/2011 | |
| JP | 2011-217663 A | | 11/2011 | |
| JP | 2011-218296 A | | 11/2011 | |
| JP | 2011-230050 A | | 11/2011 | |
| JP | 2012-161296 A | | 8/2012 | |
| JP | 2012161296 A | * | 8/2012 | |

OTHER PUBLICATIONS

European extended Search Report from corresponding European application No. 13879112.4 dated Aug. 17, 2016 (6 pgs).

International Preliminary Report on Patentability and Written Opinion from corresponding PCT application No. PCT/JP2013/062965 dated Sep. 22, 2015 (8 pgs).

Japanese Office Action with English translation from corresponding Japanese application No. JP2013-060924 dated Jun. 5, 2013 (4 pgs).

Japanese Office Action with English translation from corresponding Japanese application No. JP2013-162755 dated Oct. 18, 2016 (6 pgs).

Japanese Decision of Rejection and English translation from corresponding Japanese application No. JP2013-162755 dated May 31, 2017 (2 pgs).

Japanese Decision of Rejection of Amendment and English translation from corresponding Japanese application No. JP 2013-162755 dated May 31, 2017 (5 pgs).

Chinese Office Action with English translation from corresponding Chinese application No. CN 2013 8007 4953.6 dated Jul. 4, 2017 (23 pgs).

Australian Office Action from corresponding Australian application No. AU 2013383612 dated Jul. 28, 2017 (3 pgs).

* cited by examiner

PRODUCTION METHOD FOR ANIMAL EXCREMENT TREATMENT MATERIAL AND PRODUCTION DEVICE THEREFOR

RELATED APPLICATIONS

This application is a 35 U.S.C. § 371 national phase filing of International Patent Application No. PCT/JP2013/062965, filed May 8, 2013, through which and to which priority is claimed under 35 U.S.C. § 119 to Japanese Patent Application No. 2013-060924, filed Mar. 22, 2013, the entire disclosure of which is hereby expressly incorporated by reference.

TECHNICAL FIELD

The present invention relates to a technique for providing an animal excrement disposal material.

BACKGROUND ART

Conventionally, various types of animal excrement disposal materials are provided which change coloration by absorbing excrement. For example, Japanese Unexamined Patent Application Publication (JP-A) No. 2009-273418 discloses such an animal excrement disposal material.

The animal excrement disposal material disclosed in JP 2009-273418 includes a granule formed of fine vegetable fibers, a colored layer provided on a surface of the granule and a surface layer provided on a surface of the colored layer. The surface layer is formed of starch, super absorbent polymer and pulp.

By provision of such a structure, the animal excrement disposal material of JP-A No. 2009-273418 exhibits white in a dry state, and its surface layer becomes translucent in a wet state, so that the color of the colored layer can be exposed. In this case, the wet state refers to the state in which pet excrement is absorbed.

In the animal excrement disposal material of JP-A No. 2009-273418, however, the colored layer and the surface layer may peel from the granule. Specifically, in a step of forming the colored layer, the granules and material for the colored layer are only agitated and mixed together in a rotary coating device. Further, the same method is only performed in a step of forming the surface layer.

Therefore, for example, when shipping the finished animal excrement disposal materials, the surface layer and the colored layer may peel off by rubbing of the animal excrement disposal materials against each other.

PRIOR ART DOCUMENT

Patent Document

Patent Document 1: JP 2009-273418

SUMMARY OF THE INVENTION

Problem to be Solved by the Invention

Accordingly, it is an object of the present invention to provide a more rational constructing technique for an animal excrement disposal material.

Means for Solving the Problem

In order to solve the above-described problem, a method for manufacturing an animal excrement disposal material is provided which has a step of obtaining a pulverized material by pulverizing a raw material and a step of granulating the pulverized material. A pulverizer is used in the step of obtaining the pulverized material.

The pulverizer has a charge port for the raw material, a pulverization chamber for pulverizing the raw material, a pulverizing mechanism provided within the pulverization chamber, a mesh screen having a plurality of openings through which the raw material pulverized by the pulverizing mechanism is passed, and a discharge port formed contiguously to the openings of the mesh screen.

The raw material is pulverized by the pulverizer to obtain the pulverized material.

In an aspect of the solution according to the present invention, the pulverizer includes a first pulverizer and a second pulverizer arranged contiguously to the first pulverizer. The pulverized material can be efficiently obtained by using the first and second pulverizers.

In an aspect of the solution according to the present invention, the first pulverizer has a first mesh screen and first openings formed in the first mesh screen, and the second pulverizer has a second mesh screen and second openings formed in the second mesh screen. Further, the first openings are formed to be larger than the second openings.

In an aspect of the solution according to the present invention, the first openings have a larger diameter than the second openings.

In an aspect of the solution according to the present invention, each of the first openings has a larger area than each of the second openings.

In an aspect of the solution according to the present invention, the pulverizing mechanism includes a rotating body and a plurality of blades formed on the rotating body.

In an aspect of the solution according to the present invention, the raw material is pulp and super absorbent polymer which are generated in a process of manufacturing disposable diapers.

In an aspect of the solution according to the present invention, the animal excrement disposal material includes a core layer, a colored layer formed in the core layer and a covering layer that covers the core layer having the colored layer.

Further, in order to solve the above-described problem, a device for manufacturing an animal excrement disposal material is provided which has a pulverizer for pulverizing a raw material. The pulverizer has a charge port for the raw material, a pulverization chamber for pulverizing the raw material, a pulverizing mechanism provided within the pulverization chamber, a mesh screen having a plurality of openings through which the raw material pulverized by the pulverizing mechanism is passed, and a discharge port formed contiguously to the openings of the mesh screen.

In an aspect of the solution according to the present invention, the pulverizer includes a first pulverizer and a second pulverizer arranged contiguously to the first pulverizer.

In an aspect of the solution according to the present invention, the first pulverizer has a first mesh screen and first openings formed in the first mesh screen, and the second pulverizer has a second mesh screen and second openings formed in the second mesh screen. Further, the first openings are formed to be larger than the second openings.

In an aspect of the solution according to the present invention, the first openings have a larger diameter than the second openings.

In an aspect of the solution according to the present invention, each of the first openings has a larger area than each of the second openings.

In an aspect of the solution according to the present invention, the pulverizing mechanism includes a rotating body and a plurality of blades formed on the rotating body.

Effect of the Invention

According to the present invention, a more rational constructing technique for an animal excrement disposal material can be provided.

REPRESENTATIVE EMBODIMENT FOR CARRYING OUT THE INVENTION

A method for manufacturing an animal excrement disposal material according to the present invention is now explained below with reference to FIGS. 1 to 14. The "animal" in an embodiment of this invention widely includes vertebrates (mammals, reptiles, birds and amphibians) and invertebrates, and typically represents pets such as cats, dogs, rabbits and hamsters.

(Description of Animal Excrement Disposal Material)

Figure 1:
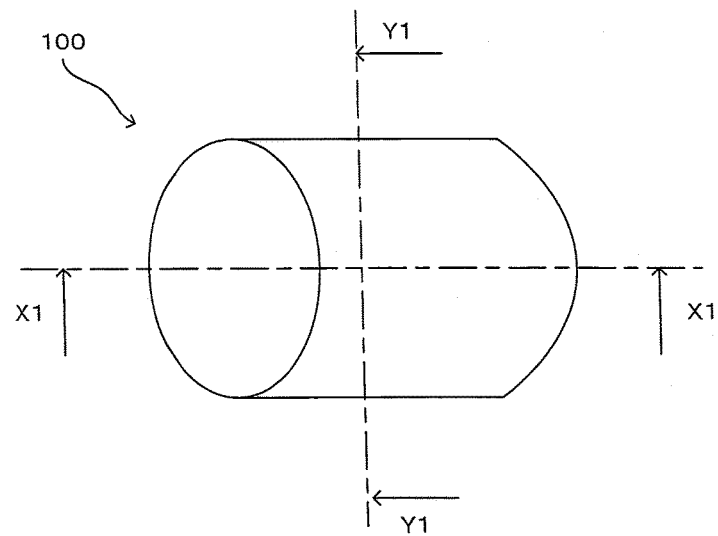
FIG. 1 is a perspective view showing an animal excrement disposal material.
Figure 2:
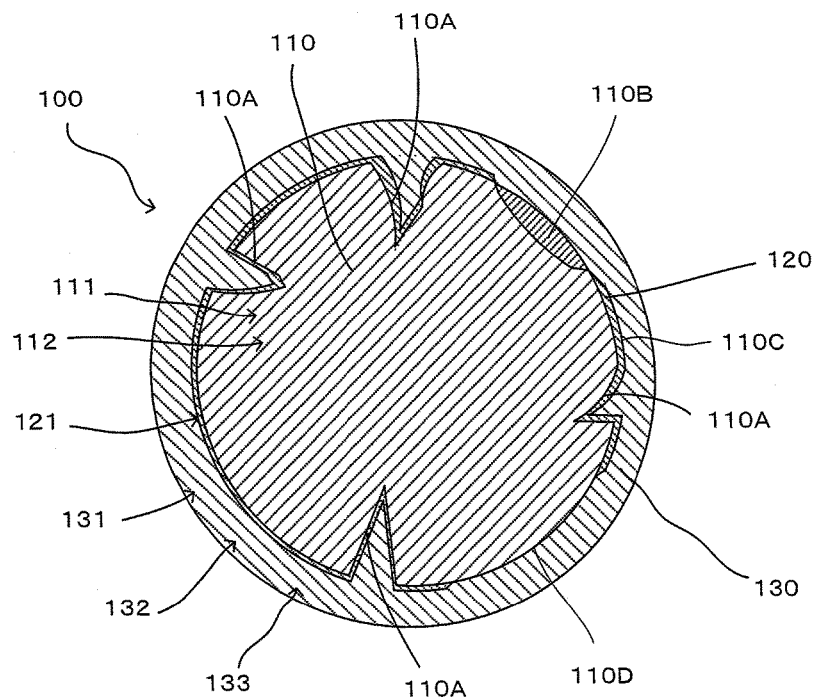
FIG. 2 is a sectional view taken along line Y1-Y1 in FIG. 1.
Figure 3:
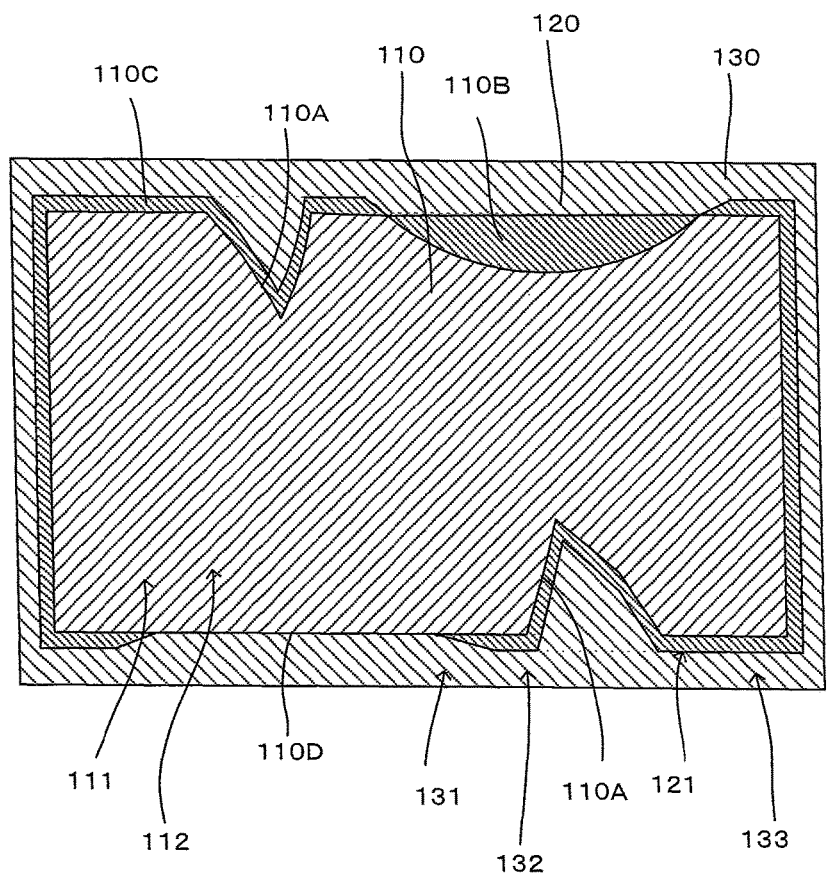
FIG. 3 is a sectional view taken along line X1-X1 in FIG. 1.

FIG. 1 is a sectional view of the animal excrement disposal material manufactured by the manufacturing method according to the present invention. The animal excrement disposal material 100 includes a core layer 110, a colored layer 120 formed in a surface of the core layer 110 and a covering layer 130 formed on a surface of the colored layer 120. The animal excrement disposal material 100, the core layer 110, the colored layer 120 and the covering layer 130 are example embodiments that correspond to the "animal excrement disposal material", the "core layer", the "colored layer" and the "covering layer", respectively, according to the present invention.

The covering layer 130 exhibits white in a dry state so that coloration of the colored layer 120 is made less visible. Specifically, surfaces of a second pulp 131 and a second super absorbent polymer 132 which form the covering layer 130 diffusely reflect light, so that the covering layer 130 exhibits white. On the other hands, the covering layer 130 improves light transmittance in a wet state. Therefore, in the wet state, a user can recognize the coloration of the colored layer 120 more clearly from a surface side of the animal excrement disposal material.

Further, in this invention, the "coloration" means not only color, but it also includes lightness, brightness and gradation.

The core layer 110 has a crack part 110A which is recessed from a surface of the core layer 110, and the covering layer 130 is formed in the crack part 110A as well. Therefore, the covering layer 130 is prevented from easily peeling from the core layer 110.

The core layer 110 is composed of a first pulp 111 and a first super absorbent polymer 112.

The first pulp 111 has a fiber length of 20 mm or less and a fiber diameter of 200 μm or less.

The first super absorbent polymer 112 has a particle diameter of 2 mm or less.

As explained in more detail below, the colored layer 120 is formed by ejecting a liquid coloring agent 1201 onto a granular core layer material 1102 for forming the core layer 110 in such a manner that the coloring agent 1201 is unevenly applied to the core layer material 1102.

Specifically, the core layer 110 has a first region 110B in which the colored layer 120 is formed by impregnation of the core layer 110 with the liquid coloring agent 1201. Further, the core layer 110 has a second region 110C in which the colored layer 120 is formed by curing of the liquid coloring agent 1201 on the surface of the core layer 110. Moreover, the core layer 110 has a third region 110D to which the liquid coloring agent 1201 is not applied.

Further, the "coloring agent" in this invention is used for coloration of an object and includes chemically synthesized agents and agents extracted from natural products. Specifically, the "coloring agent" as used in this invention is a concept including dyestuffs, pigment and other similar agents for coloring.

In this invention, the core layer 110 has the "uneven" colored layer 120, and the liquid coloring agent 1201 is "unevenly" applied to the granular core layer material 1102. The "uneven" states are now explained.

First, when the core layer 110 has at least two regions of the first region 110B, the second region 110C and the third region 110D, the colored layer 120 or the state of application of the liquid coloring agent 1201 is defined as being "uneven".

Further, when the core layer 110 has only the first region 110B of the three regions and the first region 110B has a region having a different depth of impregnation of the core layer 110 with the liquid coloring agent 1201 from the other region, the colored layer 120 or the state of application of the liquid coloring agent 1201 is defined as being "uneven".

Moreover, when the core layer 110 has only the second region 110C of the three regions and the second region 110C has a region having a different thickness of the colored region 120 on the core layer 110, the colored layer 120 or the state of application of the liquid coloring agent 1201 is defined as being "uneven".

The covering layer 130 is composed of the second pulp 131, the second super absorbent polymer 132 and a water-absorbent adhesive 133.

The second pulp 131 has a fiber length of 20 mm or less and a fiber diameter of 200 μm or less. Further, the second pulp 131 has a shorter fiber length than the first pulp 111, so that the second pulp 131 can be satisfactorily connected to the surface of the core layer 110 (the colored layer 120).

The second super absorbent polymer 132 has a particle diameter of 2 mm or less.

The water-absorbent adhesive 133 exhibits adhesiveness by absorbing liquid (or moisture). Specifically, starch is used as the water-absorbent adhesive 133. The starch can be appropriately selected from those used for this type of animal excrement disposal materials, such as tapioca starch and potato starch.

(Operation)

Operation of the animal excrement disposal material 100 according to an embodiment of the present invention is now explained.

A user puts an adequate amount of the animal excrement disposal material 100 into a container. An animal excretes onto the animal excrement disposal material 100. The light transmittance of the covering layer 130 of the animal excrement disposal material 100 is increased by absorbing liquid excrement. As a result, the user can recognize the coloration of the colored layer 120 from the outside of the animal excrement disposal material 100.

In the animal excrement disposal material 100, the second pulp 131 of the covering layer 130 first retains liquid. Subsequently, the first pulp 111 of the core layer 110 retains liquid. Next, the second super absorbent polymer 132 of the covering layer 130 retains liquid which is transferred from the second pulp 131 as well as directly transferred liquid animal excrement. Then the first super absorbent polymer 112 of the core layer 110 retains liquid. Thereafter, the water-absorbent adhesive 133 exhibits adhesiveness by absorbing liquid.

The above-described order of retaining liquid excrement is a theoretical order. The liquid retaining order of each component may be changed according to the formation state of the colored layer 120 or the amount of liquid excrement. Further, each component may simultaneously retain liquid.

The colored layer 120 is unevenly provided in the core layer 110. Specifically, the colored layer 120 has a region impregnated with the liquid coloring agent 1201 in a region of the first region 110B of the core layer 110 which is shallow from the surface of the core layer 110. Animal excrement is smoothly absorbed into the core layer 110 by passing through this region. Further, the third region 110D of the core layer 110 does not have the colored layer 120. Therefore, the animal excrement is smoothly absorbed into the core layer 110 by passing through the third region 110D.

Specifically, in the animal excrement disposal material 100 according to the present invention, by provision of the unevenly formed colored layer 120, the animal excrement can be smoothly taken into the core layer 110.

The second super absorbent polymer 132 of the covering layer 130 swells by absorbing liquid and exhibits tackiness. Therefore, the animal excrement disposal materials 100 adjacent to each other are bonded together. As a result, an aggregate of the animal excrement disposal materials 100 is formed. At this time, even if tackiness of the second super absorbent polymer 132 is reduced by drying, the water-absorbent adhesive 133 maintains adhesiveness. Therefore, the aggregated state of the animal excrement disposal materials 100 can be maintained.

Therefore, the user can recognize animal excretion by the colored layer 120 and then easily remove the aggregate of the animal excrement disposal materials 100 from the container.

(Description of Whole Manufacturing Process)

Figure 4:
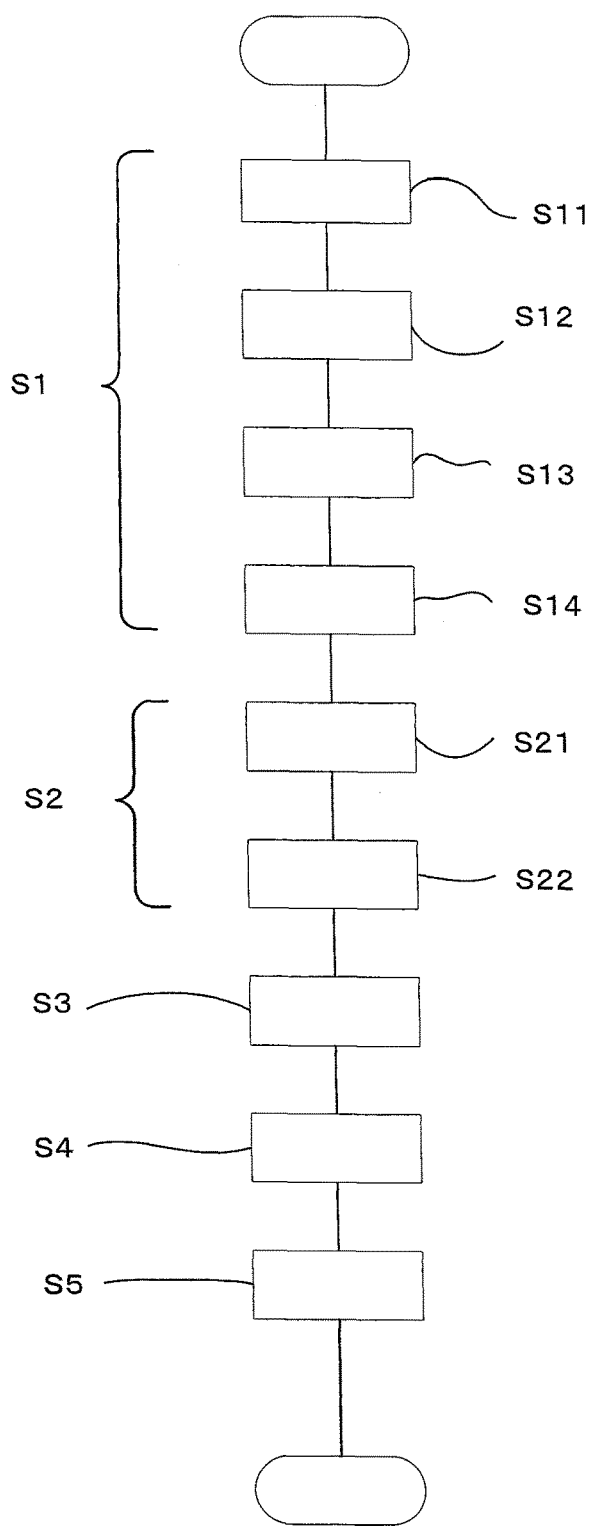
FIG. 4 is a flowchart showing a manufacturing process for the animal excrement disposal material according to the present invention.

A process of manufacturing the animal excrement disposal material according to the present invention is now explained with reference to FIG. 4.

A granulating step S1 includes a raw material pulverizing step S11, a mixing/agitating step S12, a compressing step S13 and a cutting step S14. The granulating step S1 is followed by a covering step S2. The covering step S2 includes a coloring agent applying step S21 and a covering material covering step S22. The covering step S2 is followed by a sizing step S3, a drying step S4 and an adjusting step S5. In this manner, the animal excrement disposal material is completed.

First, the granulating step S1 is explained. In the raw material pulverizing step S11, pulp and waste material which are generated in a process of manufacturing disposable diapers are used as a raw material. The raw material is pulverized by a pulverizer 300 (shredder) which is described below. The raw material pulverized by the pulverizer 300 is referred to as a pulverized material.

The raw material pulverizing step S11 is an example embodiment that corresponds to the "step of obtaining a pulverized material by pulverizing a raw material" according to the present invention.

In the mixing/agitating step S12, the pulverized material is kneaded after adding water. In the kneading step, the water content of the kneaded mixture is checked. Specifically, the input amount of water or the raw material is adjusted such that the kneaded mixture has a prescribed water content.

Further, in the mixing/agitating step S12, the pulp for forming the first pulp 111 is machined to have a fiber length of 2 mm or less, and the super absorbent polymer for forming the first super absorbent polymer is machined to have a particle diameter of 28 μm or less.

In this manner, a kneaded core layer material 1101 is formed.

In the compressing step S13, the raw material is dehydrated and then compressed by a roller. At this stage, the water content of the kneaded core layer material 1101 is adjusted to be 15 to 25% by weight.

The compressing step S13 in the manufacturing process is explained with reference to FIGS. 5 to 7. The kneaded core layer material 1101 is granulated by an extrusion compression granulator 200. As the extrusion compression granulator 200, for example, an extrusion compression granulator disclosed in Japanese Unexamined Patent Application Publication (JP-A) No. 2011-172515 may be used.

An essential part of the extrusion compression granulator 200 is formed by a die table 210 having a charge port 220, a discharge port 240 and a passage 230 connecting the charge port 220 and the discharge port 240.

Figure 5:
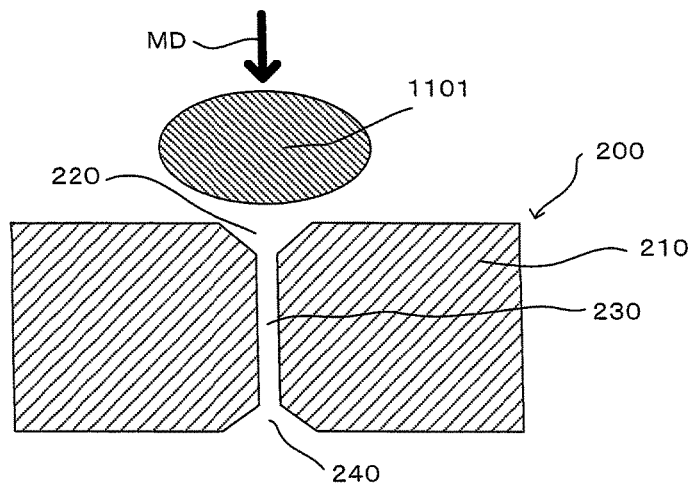
FIG. 5 is an explanatory drawing for illustrating a compressing step.

First, as shown in FIG. 5, the kneaded core layer material 1101 is transferred toward the charge port 220 of the die table 210. This transfer of the kneaded core layer material 1101 in a machine direction MD is realized by a known structure in an extrusion compression granulator of this type.

Figure 6:
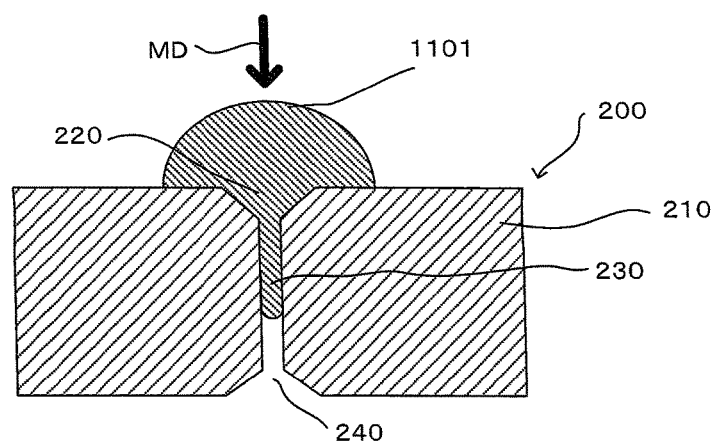
FIG. 6 is an explanatory drawing for illustrating the compressing step.

Next, as shown in FIG. 6, the kneaded core layer material 1101 transferred in the machine direction MD passes through the passage 230. At this time, the kneaded core layer material 1101 receives a prescribed pressure.

Figure 7:
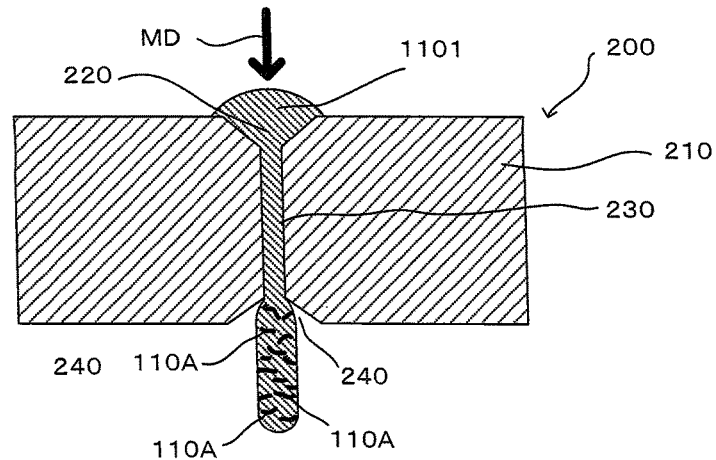
FIG. 7 is an explanatory drawing for illustrating the compressing step.

Then, as shown in FIG. 7, the kneaded core layer material 1101 is discharged from the discharge port 240 of the die table 210. At this time, the kneaded core layer material 1101 is abruptly released from pressure and cracks. The cracks form the crack parts 110A in the core layer 110 of the animal excrement disposal material 100.

The kneaded core layer material 1101 discharged from the discharge port 240 of the extrusion compression granulator 200 has a diameter of 2.5 mm to 8 mm.

In the cutting step S14, the kneaded core layer material 1101 extruded by the extrusion compression granulator 200 is cut by a rotary blade to obtain the granular core layer material 1102.

The covering step S2 is now explained. Granules obtained in the cutting step S14 are transferred to the coloring agent applying step S21. In the coloring agent applying step S21, a coloring agent solution is applied to the granular core layer material 1102. Specifically, the coloring agent solution is ejected onto the granules within a rotating drum. A colored core layer material is obtained from the granular core layer material 1102 by this step. This coloring agent applying step S21 is described in more detail below.

In the covering material covering step S22, the colored core layer material is covered with the covering material. The covering material is a mixture of the second pulp 131, the second super absorbent polymer 132 and the water-absorbent adhesive 133.

Further, a known covering machine is used to cover the colored core layer material with the covering material.

The colored core layer material covered with the covering material is transferred onto a belt conveyor. The covering material is fixed onto the colored core layer material by vibration of the belt conveyor, which is described in more detail below.

A covered granular material is obtained from the colored core layer material by this step.

In the sizing step S3, the covered granular material is sorted by the size. Specifically, the covered granular material having a small particle diameter is sorted by vibrating a sieve having a certain mesh size In the drying step S4, hot air is blown onto the covered granular material from below, so that the covered granular material is dried while repeatedly floating and dropping. As a result, the surface of the covered granular material is compacted.

In the adjusting step S5, the granules sorted based on a result of a quality test are blended so as to obtain desired animal excrement disposal materials as a whole.

The animal excrement disposal material is completed through the above-described process steps.

In the steps S1 to S5 of the present invention, various methods can be appropriately used to transfer the materials (the kneaded core layer material 1101, the granular core layer material 1102 and the covered granular material) from one step to the next. For example, a mechanical transfer means such as a belt conveyor may be used. Further, a material obtained in one step can also be carried in a container to the next step, for example, by a forklift, a cart or human power.

(Description of Raw Material Pulverizing Step S11)

Figure 8:
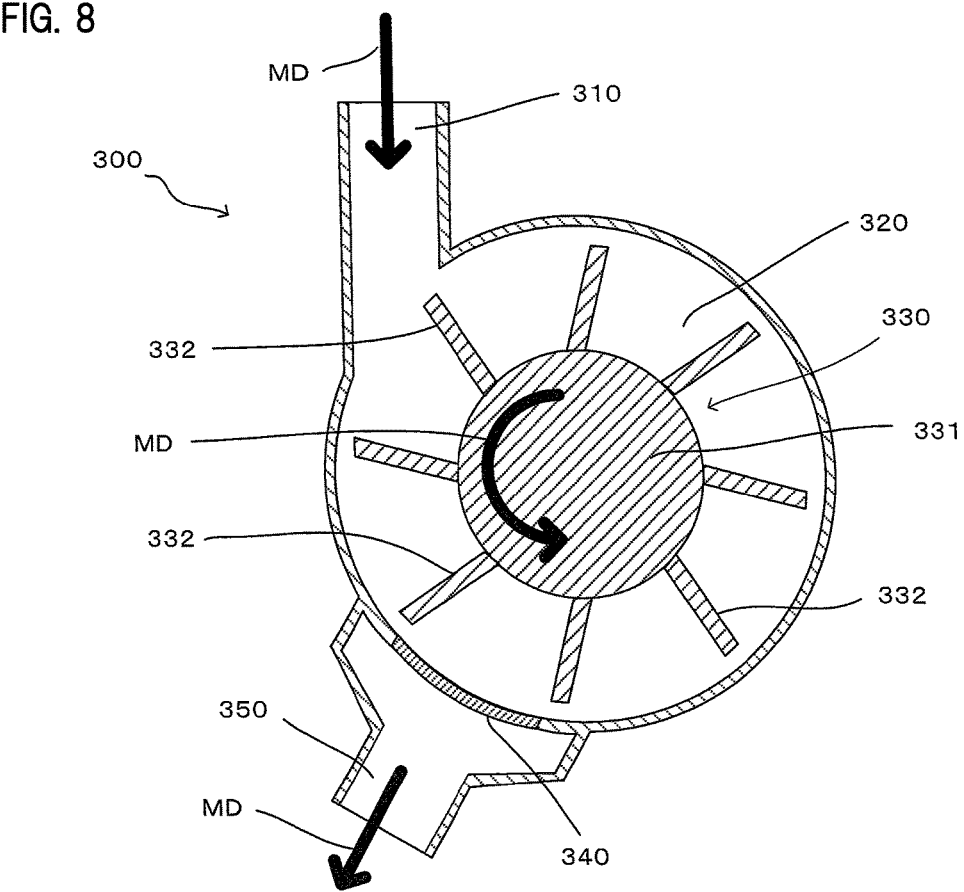
FIG. 8 is an explanatory drawing showing a pulverizer.
Figure 9:
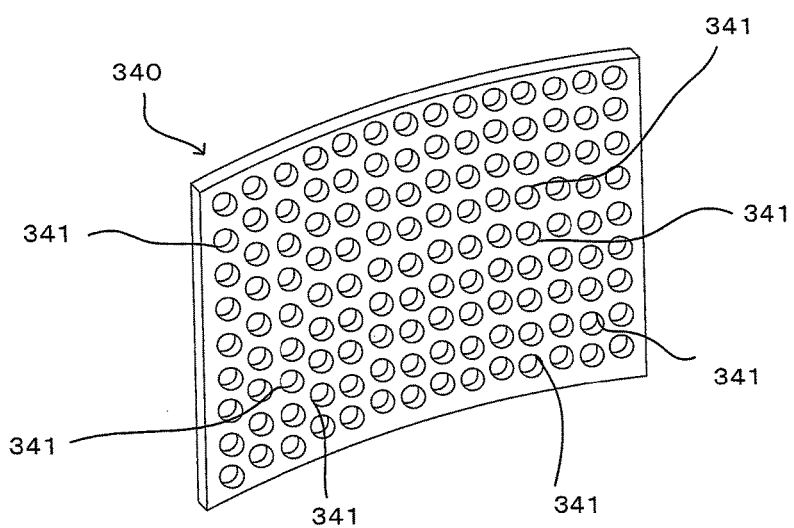
FIG. 9 is an explanatory drawing showing a mesh screen.

The raw material pulverizing step S11 and a manufacturing device related thereto are now explained with reference to FIGS. 8 to 9.

The pulverizer 300 has a known structure of a pulverizer of this type. Specifically, the pulverizer 300 has a charge port 310 for the raw material, a pulverization chamber 320 for pulverizing the raw material, a pulverizing mechanism 330 provided within the pulverization chamber 320, a mesh screen 340 having a plurality of openings 341 through which the raw material pulverized by the pulverizing mechanism 330 is passed, and a discharge port 350 formed contiguously to the openings 341 of the mesh screen 340. The raw material is turned into the pulverized material by charging from the charge port 310 and passing through the discharge port 350.

The pulverizer 300, the charge port 310, the pulverization chamber 320, the pulverizing mechanism 330, the openings 341, the mesh screen 340 and the discharge port 350 are example embodiments that correspond to the "pulverizer", the "charge port", the "pulverization chamber", the "pulverizing mechanism", the "openings", the "mesh screen" and the "discharge port", respectively, according to the present invention.

The pulverizer 300 includes a first pulverizer and a second pulverizer arranged contiguously to the first pulverizer. The first and second pulverizers are connected to each other in series.

The first pulverizer and the second pulverizer are example embodiments that correspond to the "first pulverizer" and the "second pulverizer", respectively, according to the present invention.

The first pulverizer has a first mesh screen and first openings formed in the first mesh screen. The first mesh screen and the first openings are example embodiments that correspond to the "first mesh screen" and the "first openings", respectively, according to the present invention.

The second pulverizer has a second mesh screen and second openings formed in the second mesh screen. The second mesh screen and the second openings are example embodiments that correspond to the "second mesh screen" and the "second openings", respectively, according to the present invention.

The first openings are formed to be larger than the second openings.

In the embodiment according to the present invention, both the first openings and the second openings have a circular shape. In this case, the first openings have a larger diameter than the second openings.

Specifically, each of the first openings has a diameter of 10 mm and each of the second openings has a diameter of 2 mm. Thus, the first opening has a larger area than the second opening.

Further, the first and second openings do not necessarily have to be circular.

The pulverizing mechanism 330 includes a rotating body 331 and a plurality of blades 332 formed on the rotating body 331.

The rotation speed of the rotating body 331 is 1,000 rpm. Further, the rotation speed is the same in the first pulverizer and the second pulverizer.

In the above-described embodiment, the pulverizer 300 is explained as being formed by the first and second pulverizers. As the pulverizer 300, however, a single pulverizer may be used. Further, the size of the openings in the mesh screen may be appropriately selected.

(Description of Coloring Agent Applying Step S21)

Figure 10:
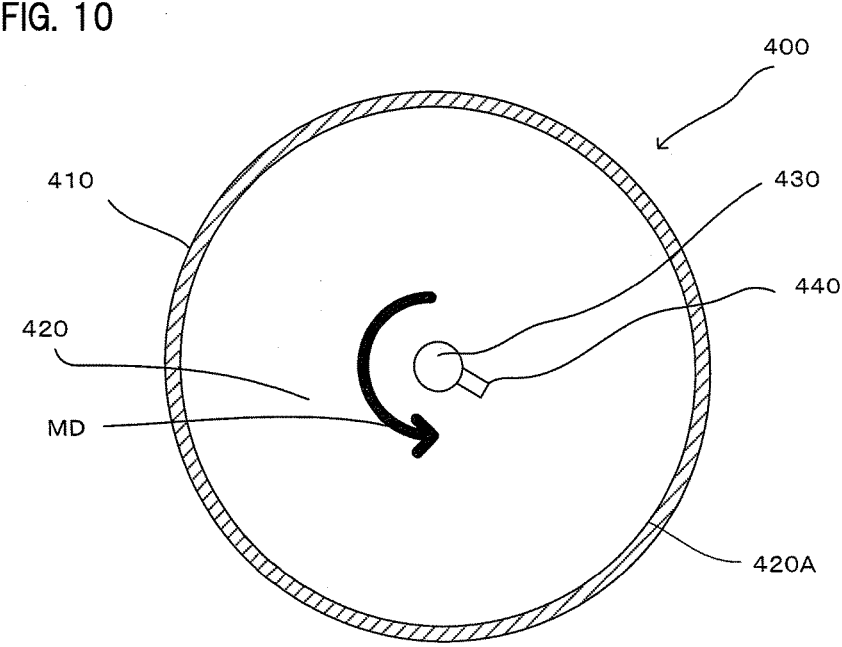
FIG. 10 is an explanatory drawing showing a coloring agent applying machine.
Figure 11:
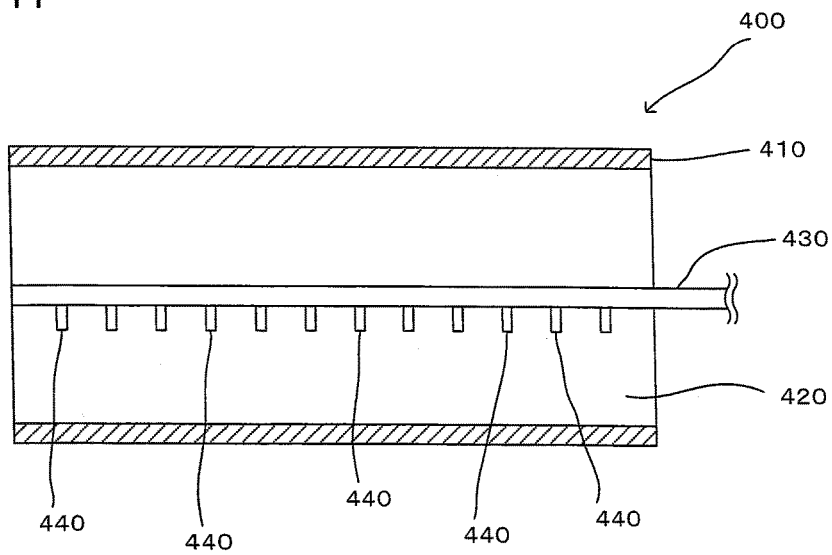
FIG. 11 is a sectional side view in FIG. 10.
Figure 12:
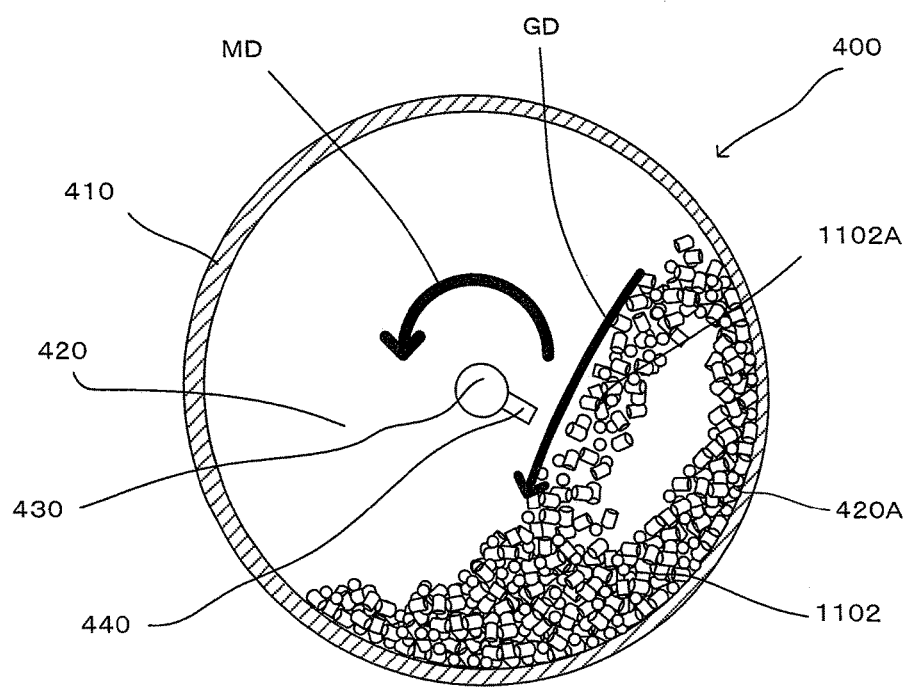
FIG. 12 is an explanatory drawing for illustrating a coloring agent applying step.

The coloring agent applying step S21 and a device related thereto are now explained with reference to FIGS. 10 to 12.

The step of applying the coloring agent to the granular core layer material 1102 has a step of floating the granular core layer material 1102 and a step of ejecting the liquid coloring agent 1201 onto the floated granular core layer material 1102. A coloring agent applying machine 400 is used to eject the liquid coloring agent 1201 onto the floated granular core layer material 1102.

In the step of applying the liquid coloring agent 1201 to the granular core layer material 1102, the coloring agent applying machine 400 is used which has a rotating drum 410, a coloring agent applying chamber 420 formed inside the rotating drum 410 to receive the granular core layer material 1102, and a nozzle 440 for applying the liquid coloring agent 1201 to the granular core layer material 1102. The nozzle 440 is connected to a pipe 430 for transporting the liquid coloring agent 1201.

In the step of floating the granular core layer material 1102, the granular core layer material 1102 is separated from an inner wall surface 420A which forms the coloring agent applying chamber 420. In this invention, the state of the granular core layer material 1102 separated from the inner wall surface 420A of the coloring agent applying chamber 420 is referred to as a "floated" or "floating" state.

The "floated" state of the granular core layer material 1102 separated from the inner wall surface 420A of the coloring agent applying chamber 420 is explained with reference to FIG. 12. The granular core layer material 1102 is conveyed into the coloring agent applying chamber 420 of the rotating drum 410. The rotating drum 410 is rotated by a rotating mechanism (not shown). The granular core layer material 1102 is pressed against the inner wall surface 420A of the coloring agent applying chamber 420 by centrifugal force caused by rotation of the rotating drum 410. In this state, the centrifugal force acting on the granular core layer material 1102 is greater than the gravity.

When the rotation of the rotating drum 410 proceeds, however, the gravity becomes greater than the centrifugal force acting on the granular core layer material 1102. At this time, the granular core layer material 1102 separates from the inner wall surface 420A and then drops in a direction of an arrow GD. Specifically, the granular core layer material 1102 "floats". The granular core layer material 1102 floats while rotating.

The nozzle 440 is directed to the floating granular core layer material 1102 and ejects the liquid coloring agent 1201 onto the granular core layer material 1102. At this time, the amount of the liquid coloring agent 1201 which is sprayed like a shower is smaller than an amount required for covering the whole surface area of the granular core layer material 1102 conveyed into the coloring agent applying chamber 420.

Specifically, the liquid coloring agent 1201 is applied to the granular core layer material 1102 while the granular core layer material 1102 is rotated and floated.

Therefore, a region of the granular core layer material 1102 to which a small amount of the liquid coloring agent 1201 is applied is impregnated with the small amount of the liquid coloring agent 1201 and forms the first region 110B in the core layer 110.

Further, another region of the granular core layer material 1102 to which a large amount of the liquid coloring agent 1201 is applied is impregnated with the large amount of liquid coloring agent 1201, and some of the liquid coloring agent 1201 which cannot be impregnated into this region is dried and cured in this region of the granular core layer material 1102. Thus, the colored layer 120 is formed on the surface of this region of the granular core layer material 1102. In this manner, this region forms the second region 110C in the core layer 110.

Further, the liquid coloring agent 1201 is not applied to the whole region of the granular core layer material 1102. A region to which the liquid coloring agent 1201 is not applied forms the third region 110D in the core layer 110.

In this manner, the core layer 110 having the uneven colored layer 120 is formed.

In the above description, the granular core layer material 1102 "floats" by balance between the centrifugal force of the rotating drum 410 and the gravity which act on the granular core layer material 1102. However, the "floating" state of the granular core layer material 1102 according to the present invention can also be realized in other states. For example, when the granular core layer material 1102 has a cylindrical shape, an end of the granular core layer material 1102 in a longitudinal direction comes in contact with the inner wall surface 420A of the rotating drum 410. At this time, the granular core layer material 1102 is flicked by the rotating inner wall surface 420A and separated from the inner wall surface 420A. In such a state, the granular core layer material 1102 is also "floated" with respect to the inner wall surface 420A.

The specific conditions in the coloring agent applying step S21 are as follows.

The size of the granular core layer material 1102 is 2 to 10 mm in diameter. The ejection amount of the liquid coloring agent 1201 from the nozzle 440 is 0.7 l/s. The diameter of the rotating drum 410 is 800 mm. The rotation speed of the rotating drum 410 is 7.5 to 11.25 rpm/min.

(Description of Covering Material Covering Step S22)

The covering material covering step S22 and a device related thereto is now explained with reference to FIGS. 13 to 14.

The step of covering the granular core layer material 1102 with the covering material (not shown) includes a step of disposing the covering material on the granular core layer material 1102 and a step of applying vibration to the granular core layer material 1102 having the covering material disposed thereon.

The covering material is composed of the second pulp 131 that is formed to be capable of retaining liquid animal excrement, a second super absorbent polymer 132 that is formed to be capable of retaining liquid excrement transferred from (retained in) the second pulp 131, and the water-absorbent adhesive 133 that is formed to be capable of exhibiting adhesiveness by absorbing liquid. This covering material forms the covering layer 130 of the animal excrement disposal material 100.

In an operation of disposing the covering material on the granular core layer material 1102, a known device such as a rotating drum as disclosed in Japanese Unexamined Patent Application Publication (JP-A) No. 2003-274780 can be used.

Figure 13:
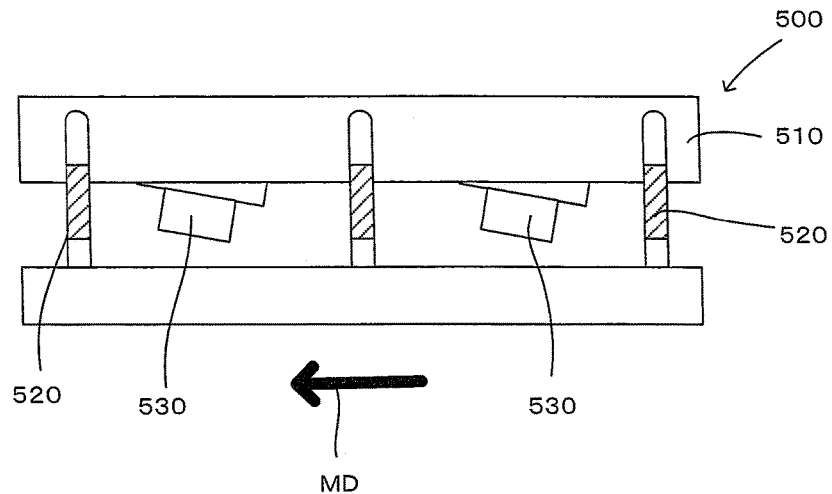
FIG. 13 is an explanatory drawing showing a belt conveyor.
Figure 14:
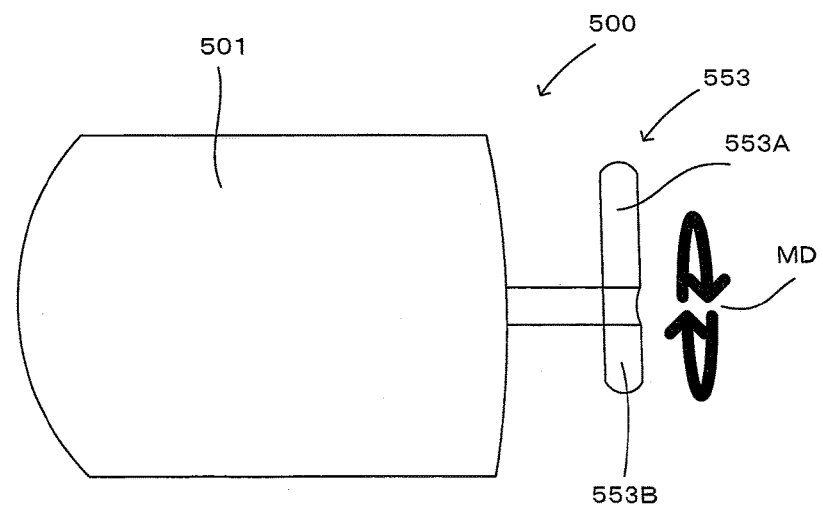
FIG. 14 is an explanatory drawing showing a vibration generating motor.

In the step of applying vibration to the granular core layer material 1102 having the covering material disposed thereon, the granular core layer material 1102 is conveyed by a belt conveyor 500 shown in FIG. 13. The belt conveyor 500 has a conveyance part 510 that conveys the granular core layer material 1102, and a vibration generating part 530 that applies vibration to the conveyance part 510. Vibration generated by the vibration generating part 530 is absorbed by a damper 520, so that the vibration is prevented from being easily transmitted to a base 540 for supporting the belt conveyor 500.

The vibration generating part 530 includes a vibration generating motor 550. The vibration generating motor 550 has a body 551 having a known mechanism for rotating a shaft 552.

A weight 553 is provided on the shaft 552. The weight 553 has a first weight region 553A and a second weight region 553B which are formed on opposite sides of the shaft 552. The first weight region 553A and the second weight region 553B have different lengths in the longitudinal direction. By provision of the weight 553 having such a structure, the vibration generating motor 550 can vibrate the conveyance part 510.

The covering material is pressed against the granular core layer material 1102 by vibration which is applied to the conveyance part 510 by the vibration generating part 530. Specifically, the conveyance part 510 is vibrated, so that the granular core layer material 1102 is also vibrated. Thus, the granular core layer material 1102 jumps up from the conveyance part 510 and drops onto the conveyance part 510. By the drop of the granular core layer material 1102 onto the conveyance part 510, the covering material is pressed against the granular core layer material 1102.

In the covering material covering step S22, the granular core layer material 1102 contains water. Specifically, the granular core layer material 1102 retains water added in the mixing/agitating step S12 and the coloring agent applying step S21. Therefore, the first super absorbent polymer 112 of the granular core layer material 1102 is swollen and exhibits tackiness. The covering material is bonded to the granular core layer material 1102 by the tacky first super absorbent polymer 112. Further, the covering material is reliably fixed to the granular core layer material 1102 by vibration of the vibration generating part 530.

In the above-described belt conveyor 500, vibration is forcibly applied to the conveyance part 510 by the vibration generating part 530. Depending on the structure of the belt conveyor 500, however, prescribed vibration may be applied to the conveyance part 510 merely by driving the conveyance part 510. In such a case, it is not necessary to provide the vibration generating part 530 in the belt conveyor 500.

The specific conditions in the covering material covering step S22 are as follows.

The size of the granular core layer material 1102 is 2 to 10 mm in diameter. The percentage of the second pulp 131 in the covering material is 60% by weight. The percentage of the second super absorbent polymer 132 in the covering material is 10% by weight. The percentage of the water-absorbent adhesive 133 in the covering material is 30% by weight. The operation conditions of the vibration generating motor 550 are 1.5 k and (the rotation speed of) 1,700 rpm. The time it takes for the granular core layer material 1102 to pass through the belt conveyor 500 is 90 seconds.

The method and the device for manufacturing an animal excrement disposal material according to the present invention are not limited to those as described above. Especially, a known manufacturing device can be appropriately selected as the manufacturing device.

(Correspondences between the Features of the Embodiments and the Features of the Invention)

The animal excrement disposal material 100 is an example embodiment that corresponds to the "animal excrement disposal material" according to the present invention. The core layer 110 is an example embodiment that corresponds to the "core layer" according to the present invention. The colored layer 120 is an example embodiment that corresponds to the "colored layer" according to the present invention. The covering layer 130 is an example embodiment that corresponds to the "covering layer" according to the present invention. The raw material pulverizing step S11 is an example embodiment that corresponds to the "step of obtaining a pulverized material by pulverizing a raw material" according to the present invention. The pulverizer 300, the charge port 310, the pulverization chamber 320, the pulverizing mechanism 330, the openings 341, the mesh screen 340 and the discharge port 350 are example embodiments that correspond to the "pulverizer", the "charge port", the "pulverization chamber", the "pulverizing mechanism", the "openings", the "mesh screen" and the "discharge port", respectively, according to the present invention. The first pulverizer and the second pulverizer are example embodiments that correspond to the "first pulverizer" and the "second pulverizer", respectively, according to the present invention. The first mesh screen and the first openings are example embodiments that correspond to the "first mesh screen" and the "first openings", respectively, according to the present invention. The second mesh screen and the second openings are example embodiments that correspond to the "second mesh screen" and the "second openings", respectively, according to the present invention.

In view of the nature of the above-described invention, various features can be provided as follows.

(Aspect 1)

A method for manufacturing an animal excrement disposal material, comprising:

a step of obtaining a pulverized material by pulverizing a raw material and a step of granulating the pulverized material, in the step of obtaining the pulverized material, the pulverized material is obtained by pulverizing the raw material by a pulverizer, and the pulverizer has a charge port for the raw material, a pulverization chamber for pulverizing the raw material, a pulverizing mechanism provided within the pulverization chamber, a mesh screen having a plurality of openings through which the raw material pulverized by the pulverizing mechanism is passed, and a discharge port formed contiguously to the openings of the mesh screen.

(Aspect 2)

The manufacturing method as defined in aspect 1, wherein the pulverizer includes a first pulverizer and a second pulverizer arranged contiguously to the first pulverizer.

(Aspect 3)

The manufacturing method as defined in aspect 2, wherein:

the first pulverizer has a first mesh screen and first openings formed in the first mesh screen, the second pulverizer has a second mesh screen and second openings formed in the second mesh screen, and the first openings are formed to be larger than the second openings.

(Aspect 4)

The manufacturing method as defined in aspect 3, wherein the first openings have a larger diameter than the second openings.

(Aspect 5)

The manufacturing method as defined in aspect 4, wherein each of the first openings has a diameter of 10 mm and each of the second openings has a diameter of 2 mm.

(Aspect 6)

The manufacturing method as defined in any one of aspects 3 to 5, wherein each of the first openings has a larger area than each of the second openings.

(Aspect 7)

The manufacturing method as defined in any one of aspects 1 to 6, wherein the pulverizing mechanism comprises a rotating body and a plurality of blades formed on the rotating body.

(Aspect 8)

The manufacturing method as defined in aspect 7, wherein a rotation speed of the rotating body is 1,000 rpm.

(Aspect 9)

The manufacturing method as defined in any one of aspects 1 to 8, wherein the raw material is pulp and super absorbent polymer which are generated in a process of manufacturing disposable diapers.

(Aspect 10)

The manufacturing method as defined in any one of aspects 1 to 9, wherein the raw material pulverized in the step of pulverizing the raw material is subjected to a step of adding water and kneading.

(Aspect 11)

The manufacturing method as defined in any one of aspects 1 to 10, wherein the raw material subjected to the step of adding water and kneading has a water content of 15 to 25 percent.

(Aspect 12)

The manufacturing method as defined in aspect 11, wherein the pulp in the raw material subjected to the step of adding water and kneading has a fiber length of 2 mm or less.

(Aspect 13)

The manufacturing method as defined in aspect 12, wherein the super absorbent polymer in the raw material subjected to the step of adding water and kneading has a particle diameter of 28 μm or less.

(Aspect 14)

The manufacturing method as defined in any one of aspects 1 to 13, wherein the animal excrement disposal material comprises a core layer, a colored layer formed in the core layer and a covering layer that covers the core layer having the colored layer.

(Aspect 15)

The manufacturing method as defined in aspect 14, wherein the core layer comprises a first primary water-retaining member that is formed to be capable of retaining liquid animal excrement, and a first secondary water-retaining member that is formed to be capable of retaining liquid excrement transferred from (retained in) the first primary water-retaining member.

(Aspect 16)

The manufacturing method as defined in aspect 14 or 15, wherein the colored layer is unevenly formed in the core layer.

(Aspect 17)

The manufacturing method as defined in any one of aspects 14 to 16, wherein the covering layer comprises a second primary water-retaining member that is formed to be capable of retaining liquid animal excrement, a second secondary water-retaining member that is formed to be capable of retaining liquid excrement transferred from the second primary water-retaining member, and a water-absorbent adhesive that is formed to be capable of exhibiting adhesiveness by absorbing liquid.

(Aspect 18)

The manufacturing method as defined in any one of aspects 14 to 17, wherein the pulp forms the first primary water-retaining member.

(Aspect 19)

The manufacturing method as defined in any one of aspects 14 to 17, wherein the super absorbent polymer forms the first secondary water-retaining member.

(Aspect 20)

A device for manufacturing an animal excrement disposal material, comprising:

a pulverizer for pulverizing a raw material, wherein:

the pulverizer has a charge port for the raw material, a pulverization chamber for pulverizing the raw material, a pulverizing mechanism provided within the pulverization chamber, a mesh screen having a plurality of openings through which the raw material pulverized by the pulverizing mechanism is passed, and a discharge port formed contiguously to the openings of the mesh screen.

(Aspect 21)

The manufacturing device as defined in aspect 20, wherein the pulverizer includes a first pulverizer and a second pulverizer arranged contiguously to the first pulverizer.

(Aspect 22)

The manufacturing device as defined in aspect 21, wherein:

the first pulverizer has a first mesh screen and first openings formed in the first mesh screen, the second pulverizer has a second mesh screen and second openings formed in the second mesh screen, and the first openings are formed to be larger than the second openings.

(Aspect 23)

The manufacturing device as defined in aspect 22, wherein the first openings have a larger diameter than the second openings.

(Aspect 24)

The manufacturing device as defined in aspect 23, wherein each of the first openings has a diameter of 10 mm and each of the second openings has a diameter of 2 mm.

(Aspect 25)

The manufacturing device as defined in any one of aspects 22 to 24, wherein each of the first openings has a larger area than each of the second openings.

(Aspect 26)

The manufacturing device as defined in any one of aspects 20 to 25, wherein the pulverizing mechanism comprises a rotating body and a plurality of blades formed on the rotating body.

(Aspect 27)

The manufacturing device as defined in aspect 26, wherein a rotation speed of the rotating body is 1,000 rpm.

DESCRIPTION OF THE NUMERALS 100 animal excrement disposal material
110 core layer
1101 kneaded core layer material
1102 granular core layer material
1102A dropping granular core layer material
110A crack part
110B first region
110C second region
110D third region
111 first pulp (first primary water-retaining member)
112 first super absorbent polymer (first secondary water-retaining member)
120 colored layer
1201 liquid coloring agent
121 coloring agent part
130 covering layer
131 second pulp (second primary water-retaining member)
132 second super absorbent polymer (second secondary water-retaining member)
133 water-absorbent adhesive
200 extrusion compression granulator
210 die table
220 charge port
230 passage
240 discharge port
300 pulverizer
310 charge port
320 pulverization chamber
330 pulverizing mechanism 331 rotating body
332 blade
340 mesh screen
341 opening
350 discharge port
400 coloring agent applying machine
410 rotating drum
420 coloring agent applying chamber
420A inner wall surface
430 (liquid transport) pipe
440 nozzle
500 belt conveyor
510 conveyance part
520 damper
530 vibration generating part
540 base
550 vibration generating motor
551 body
552 shaft
553 weight
553A first weight region
553B second weight region
S1 granulating step
S11 raw material pulverizing step
S12 mixing/agitating step
S13 compressing step
S14 cutting step
S2 covering step
S21 coloring agent applying step
S22 covering material covering step
S3 sizing step
S4 drying step
S5 adjusting step
GD dropping direction
MD machine direction

The invention claimed is:

1. A method for manufacturing an animal excrement disposal material comprising:
    obtaining a waste pulp and super absorbent polymer from a disposable diaper manufacturing process,
    pulverizing the waste pulp and super absorbent polymer to form a pulverized material,
    making a kneaded core layer material by adding water to and kneading the pulverized material,
    forming a granule material from the kneaded core layer material,
    forming an uneven colored layer on the granule material,
    making a covered granule material by covering the granule material with a covering material,
    wherein the pulverized material is made by pulverizing a raw material by a first pulverizer and a second pulverizer arranged contiguously to the first pulverizer,
    the first pulverizer has a first mesh screen and first openings formed in the first mesh screen,
    the second pulverizer has a second mesh screen and second openings formed in the second mesh screen, and
    the first openings are larger than the second openings,
    the pulverized material includes pulp and super absorbent polymer from the waste material,
    the granule material is formed by an extrusion compression granulator and a rotary blade, wherein the extrusion compression granulator applies pressure to the kneaded core layer material and discharges the kneaded core layer material through a discharge port and the rotary blade cuts the kneaded core layer material from the discharge port to obtain the granule material,
    the granule material has cracks formed therein by being released abruptly from the pressure applied by the extrusion compression granulator,
    the covering material covers a surface of the granule material including the cracks formed therein.

2. The manufacturing method as defined in claim 1, wherein the first openings have a larger diameter than the second openings.

3. The manufacturing method as defined in claim 1, wherein each of the first openings has a larger area than each of the second openings.

4. The manufacturing method as defined in claim 1, wherein the first and second pulverizers each comprise a rotating body and a plurality of blades formed on the rotating body.

* * * * *